(12) United States Patent
Oota

(10) Patent No.: US 11,298,919 B2
(45) Date of Patent: Apr. 12, 2022

(54) INTERLAYER FOR LAMINATED GLASS, AND LAMINATED GLASS

(71) Applicant: SEKISUI CHEMICAL CO., LTD., Osaka (JP)

(72) Inventor: Yuusuke Oota, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/086,587

(22) PCT Filed: Mar. 29, 2017

(86) PCT No.: PCT/JP2017/012985
§ 371 (c)(1),
(2) Date: Sep. 19, 2018

(87) PCT Pub. No.: WO2017/170727
PCT Pub. Date: Oct. 5, 2017

(65) Prior Publication Data
US 2019/0084276 A1    Mar. 21, 2019

(30) Foreign Application Priority Data
Mar. 30, 2016    (JP) .............................. JP2016-067873

(51) Int. Cl.
*B32B 17/10*    (2006.01)
*B32B 27/08*    (2006.01)
(Continued)

(52) U.S. Cl.
CPC ........ *B32B 17/10761* (2013.01); *B32B 3/263* (2013.01); *B32B 17/10036* (2013.01);
(Continued)

(58) Field of Classification Search
CPC ... B32B 17/10761; B32B 27/08; B32B 27/22; B32B 17/10568; B32B 27/30;
(Continued)

(56) References Cited

U.S. PATENT DOCUMENTS

| 2003/0215610 A1 | 11/2003 | DiGiampaolo et al. |
| 2004/0053006 A1 | 3/2004 | Omizu et al. |

(Continued)

FOREIGN PATENT DOCUMENTS

| CA | 2 932 471 A1 | 6/2015 |
| CA | 2 932 635 A1 | 6/2015 |

(Continued)

OTHER PUBLICATIONS

Written Opinion of the International Searching Authority (PCT/ISA/237) for Application No. PCT/JP2017/012985 dated Jun. 27, 2017 (English Translation dated Oct. 11, 2018).

(Continued)

*Primary Examiner* — Brian Handville
(74) *Attorney, Agent, or Firm* — Cheng Law Group, PLLC

(57) ABSTRACT

Provided is an interlayer film for laminated glass with which both the reflected double images and the transmitted double images can be suppressed in the laminated glass. An interlayer film for laminated glass according to the present invention is an interlayer film for laminated glass used for laminated glass that is a head-up display, in which the interlayer film includes a region for display corresponding to a display region of the head-up display, the interlayer film has one end and the other end on the opposite side of the one end, the other end has a thickness larger than a thickness of the one end, an absolute value of difference between a maximum value of measured values of variation in thickness and a minimum value of measured values of variation in (Continued)

thickness is 32 μm or less when the variation in thickness is measured in a distance of 80 mm centered at points of every 2 mm intervals in a direction connecting the one end and the other end in the region for display from the one end to the other end, and a region of the other end side from the region for display has a wedge angle that is smaller than a wedge angle of the region for display.

16 Claims, 4 Drawing Sheets

(51) Int. Cl.
    *B32B 27/22*     (2006.01)
    *B32B 27/30*     (2006.01)
    *B32B 3/26*     (2006.01)

(52) U.S. Cl.
    CPC .. *B32B 17/10568* (2013.01); *B32B 17/10605* (2013.01); *B32B 27/08* (2013.01); *B32B 27/22* (2013.01); *B32B 27/30* (2013.01); *B32B 2250/03* (2013.01); *B32B 2250/05* (2013.01); *B32B 2250/246* (2013.01); *B32B 2250/40* (2013.01); *B32B 2307/102* (2013.01); *B32B 2307/306* (2013.01); *B32B 2307/40* (2013.01); *B32B 2605/006* (2013.01); *B32B 2605/08* (2013.01)

(58) Field of Classification Search
    CPC .............. B32B 3/263; B32B 17/10036; B32B 17/10605; B32B 2250/05; B32B 2250/03; B32B 2250/40; B32B 2250/246; B32B 2605/08; B32B 2307/102; B32B 2307/306; B32B 2307/40; B32B 2605/006; B60J 1/02
    See application file for complete search history.

(56) References Cited

U.S. PATENT DOCUMENTS

| | | | |
|---|---|---|---|
| 2007/0148472 A1* | 6/2007 | Masaki | ............. B32B 17/10568 428/426 |
| 2009/0294212 A1 | 12/2009 | Miyai | |
| 2011/0094825 A1 | 4/2011 | Miyai | |
| 2012/0003428 A1 | 1/2012 | Miyai | |
| 2013/0149503 A1* | 6/2013 | Yamamoto | ........ B32B 17/10761 428/172 |
| 2014/0178651 A1 | 6/2014 | Miyai | |
| 2015/0168619 A1* | 6/2015 | Ohmoto | ............ B32B 17/10036 359/359 |
| 2015/0258747 A1 | 9/2015 | Miyai | |
| 2016/0159041 A1* | 6/2016 | Lu | ..................... B32B 17/10761 428/162 |
| 2016/0291324 A1* | 10/2016 | Arndt | ................ B32B 17/10036 |
| 2016/0341960 A1 | 11/2016 | Miyai | |

FOREIGN PATENT DOCUMENTS

| | | | | |
|---|---|---|---|---|
| CN | 1642866 A | 7/2005 | | |
| CN | 201209132 Y | 3/2009 | | |
| CN | 101443287 A | 5/2009 | | |
| CN | 103080037 A | 5/2013 | | |
| JP | 4-502525 A | 5/1992 | | |
| JP | 2005-068006 A | 3/2005 | | |
| JP | 2009-35444 A | 2/2009 | | |
| JP | 2012-106932 A | 6/2012 | | |
| WO | WO-91/06031 A1 | 5/1991 | | |
| WO | WO-2014021407 A1 * | 2/2014 | ........... | B32B 27/306 |
| WO | WO-2015086233 A1 * | 6/2015 | ....... | B32B 17/10761 |
| WO | WO-2017/090561 A1 | 6/2017 | | |

OTHER PUBLICATIONS

International Search Report for the Application No. PCT/JP2017/012985 dated Jun. 27, 2017.
Written Opinion of the International Searching Authority (PCT/IS/237) for Application No. PCT/JP2017/012985 dated Jun. 27, 2017.
Supplementary European Search Report for the Application No. EP 17 775 261.5 dated Sep. 6, 2019.
The First Office Action for the Application No. 201780017155.8 from The State Intellectual Property Office of the People's Republic of China dated Oct. 10, 2020.
Notification of Reasons for Refusal for the Application No. 2017-518580 from Japan Patent Office dated Jun. 15, 2021.

* cited by examiner

[FIG. 1]
(a)
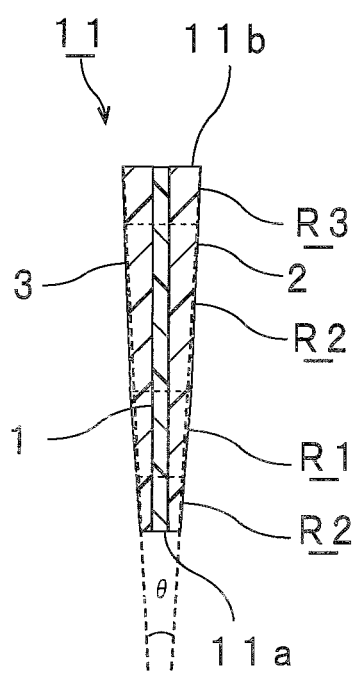
(b)
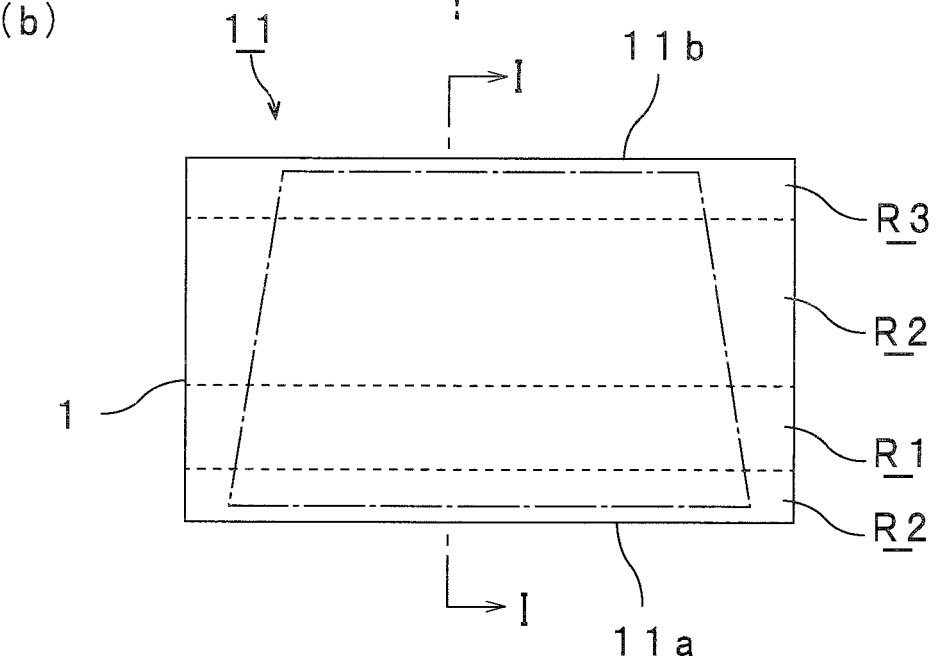

[FIG. 2]
(a)
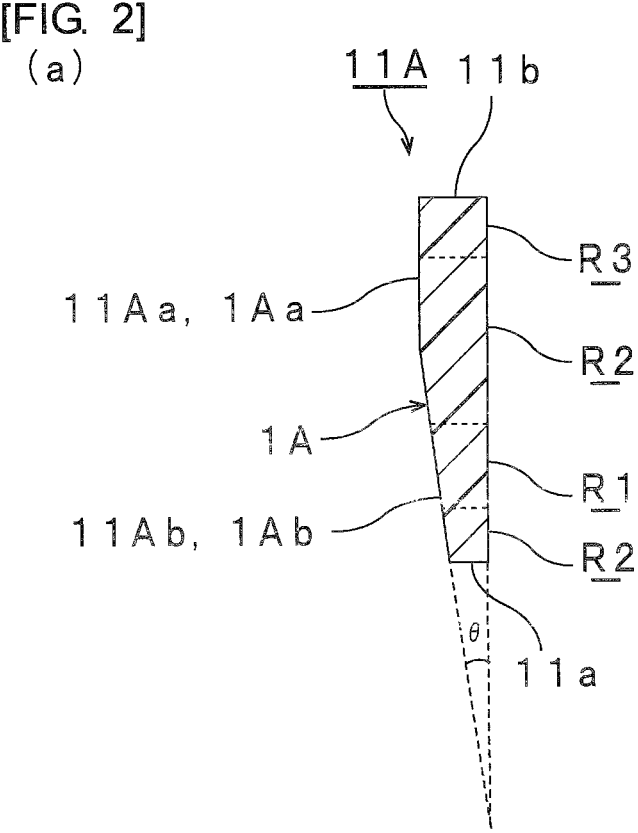
(b)
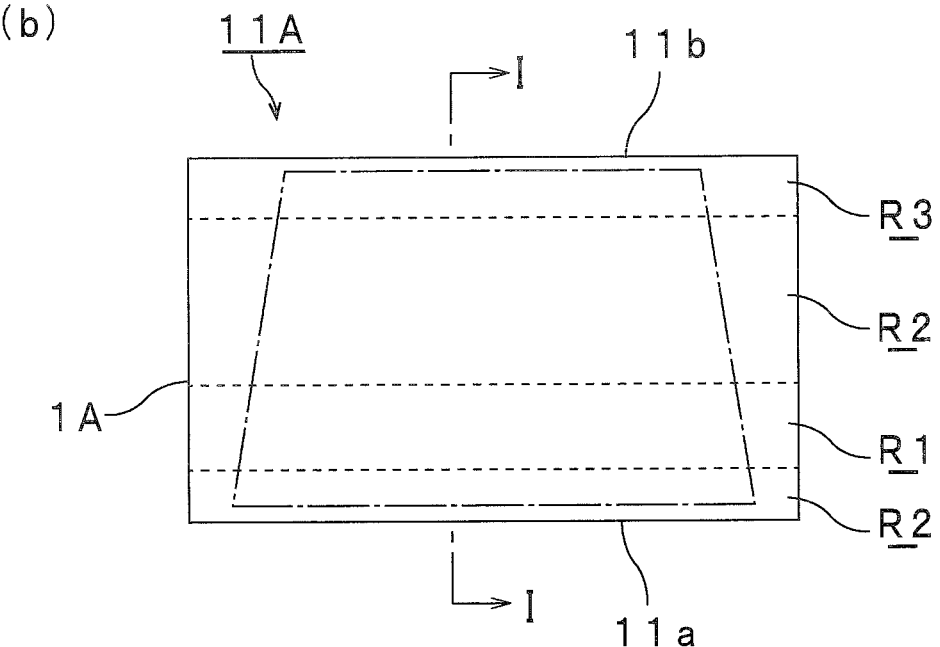

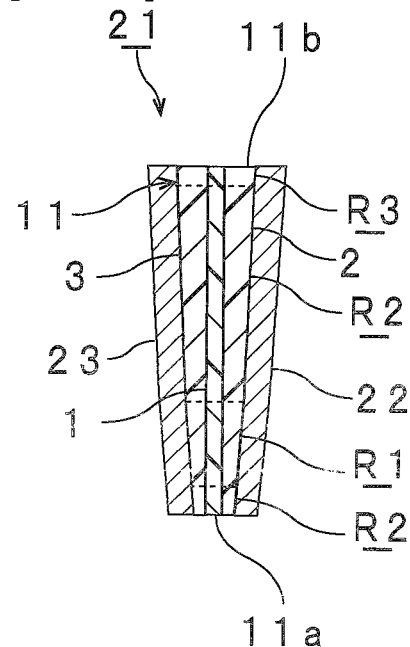
[FIG. 3]
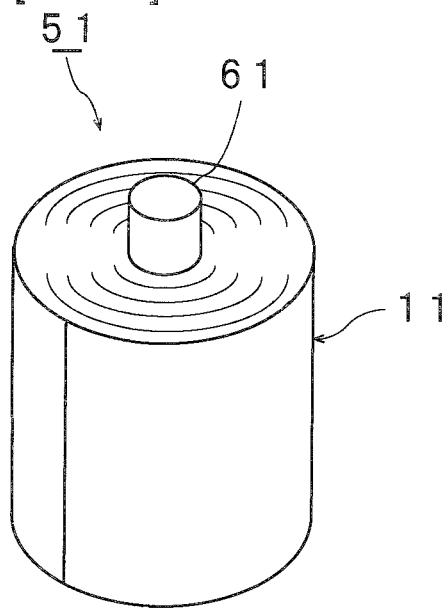
[FIG. 4]

[FIG. 5]
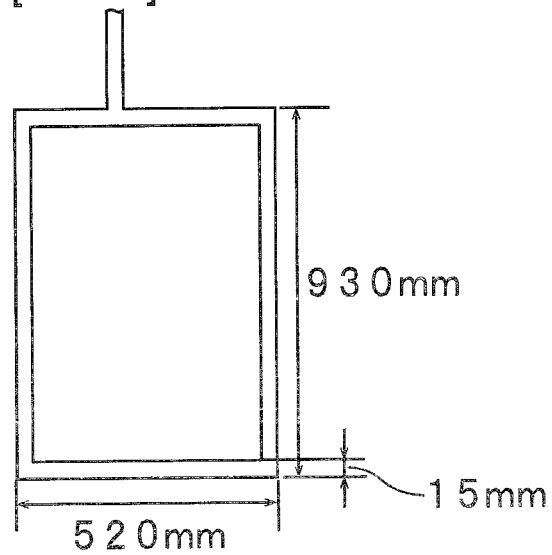

INTERLAYER FOR LAMINATED GLASS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generally generates only a small amount of scattering glass fragments even when subjected to external impact and broken, laminated glass is excellent in safety. For that reason, the laminated glass is widely used for automobiles, railway vehicles, aircraft, ships, buildings and the like. The laminated glass is produced by sandwiching an interlayer film for laminated glass between a pair of glass plates.

Moreover, as the laminated glass used for automobiles, a head-up display (HUD) has been known. In the HUD, on the windshield of an automobile, measured information such as the speed that is traveling data of the automobile and the like can be displayed.

In the HUD, there is a problem that the measured information displayed on the windshield is doubly observed.

In order to suppress double images, a wedge-like shaped interlayer film has been used. The following Patent Document 1 discloses a sheet of laminated glass in which a wedge-like shaped interlayer film having a prescribed wedge angle is sandwiched between a pair of glass plates. In such a sheet of laminated glass, by the adjustment of the wedge angle of the interlayer film, a display of measured information reflected by one glass plate and a display of measured information reflected by the other glass plate can be focused into one point to make an image in the visual field of a driver. For that reason, the display of measured information is hard to be observed doubly and the visibility of a driver is hardly hindered.

RELATED ART DOCUMENT

Patent Document

Patent Document 1: JP H4-502525 T

SUMMARY OF THE INVENTION

Problems to be Solved by the Invention

In the HUD, it is desired that reflected double images be not generated in the display region for the measured information or the like. The reflected double images refer to the phenomenon that double images are observed, for example, by illumination of information from an information display device.

In the HUD of automobile, for example, the region above the display region is a part where the driver checks the driving road. Therefore, in the region above the display region, it is desired that transmitted double images be not generated. The transmitted double images refer to the phenomenon that double images are observed, for example, by illumination of the headlamp of the car on the opposite lane.

In conventional interlayer films, it is difficult to sufficiently suppress both the reflected double images and the transmitted double images.

An object of the present invention is to provide an interlayer film for laminated glass with which both the reflected double images and the transmitted double images can be suppressed in the laminated glass. Moreover, another object of the present invention is to provide laminated glass prepared with the above-mentioned interlayer film for laminated glass.

Means for Solving the Problems

According to a broad aspect of the present invention, there is provided an interlayer film for laminated glass (in this specification, sometimes abbreviated as "interlayer film") used for laminated glass that is a head-up display, the interlayer film including a region for display corresponding to a display region of the head-up display, the interlayer film having one end and the other end on an opposite side of the one end, the other end having a thickness larger than a thickness of the one end, an absolute value of difference between a maximum value of measured values of variation in thickness and a minimum value of measured values of variation in thickness being 32 µm or less when the variation in thickness being measured in a distance of 80 mm centered at points of every 2 mm intervals in a direction connecting the one end and the other end in the region for display from the one end to the other end, and a region of the other end side from the region for display having a wedge angle that is smaller than a wedge angle of the region for display.

In a certain aspect of the interlayer film according to the present invention, the region of the other end side from the region for display has a wedge angle that is smaller than the wedge angle of the region for display by 0.05 mrad or more.

In a certain aspect of the interlayer film according to the present invention, the interlayer film has the region for display in a region between a position of 10 cm toward the other end from the one end and a position of 59.8 cm toward the other end from the one end.

The region of the other end side from the region for display has a wedge angle of preferably 0.7 mrad or less, more preferably 0.5 mrad or less, further preferably 0.3 mrad or less, particularly preferably 0.1 mrad or less.

It is preferred that the interlayer film contain a thermoplastic resin. It is preferred that the interlayer film contain a plasticizer.

In a certain aspect of the interlayer film according to the present invention, the interlayer film is provided with a first layer and a second layer arranged on a first surface side of the first layer.

In a certain aspect of the interlayer film according to the present invention, the first layer contains a polyvinyl acetal resin, the second layer contains a polyvinyl acetal resin, and a content of a hydroxyl group of the polyvinyl acetal resin in the first layer is lower than a content of a hydroxyl group of the polyvinyl acetal resin in the second layer.

In a certain aspect of the interlayer film according to the present invention, the first layer contains a polyvinyl acetal resin, the second layer contains a polyvinyl acetal resin, the first layer contains a plasticizer, the second layer contains a plasticizer, and a content of the plasticizer in the first layer relative to 100 parts by weight of the polyvinyl acetal resin in the first layer is larger than a content of the plasticizer in the second layer relative to 100 parts by weight of the polyvinyl acetal resin in the second layer.

According to a broad aspect of the present invention, there is provided laminated glass including a first lamination glass member, a second lamination glass member and the interlayer film for laminated glass described above, the interlayer film for laminated glass being arranged between the first lamination glass member and the second lamination glass member.

Effect of the Invention

An interlayer film for laminated glass according to the present invention is an interlayer film for laminated glass used for laminated glass that is a head-up display, in which the interlayer film includes a region for display corresponding to a display region of the head-up display, the interlayer film has one end and the other end on an opposite side of the one end, the other end has a thickness larger than a thickness of the one end, an absolute value of difference between a maximum value of measured values of variation in thickness and a minimum value of measured values of variation in thickness is 32 μm or less when the variation in thickness is measured in a distance of 80 mm centered at points of every 2 mm intervals in a direction connecting the one end and the other end in the region for display from the one end to the other end, a region of the other end side from the region for display has a wedge angle that is smaller than a wedge angle of the region for display. Accordingly, it is possible to suppress both reflected double images and transmitted double images in the laminated glass.

BRIEF DESCRIPTION OF DRAWINGS

FIGS. 1(a) and (b) are a sectional view and a front view schematically showing an interlayer film for laminated glass in accordance with a first embodiment of the present invention.

FIGS. 2(a) and (b) are a sectional view and a front view schematically showing an interlayer film for laminated glass in accordance with a second embodiment of the present invention.

FIG. 3 is a sectional view showing an example of laminated glass prepared with the interlayer film for laminated glass shown in FIG. 1.

FIG. 4 is a perspective view schematically showing a roll body prepared by winding the interlayer film for laminated glass shown in FIG. 1.

FIG. 5 is a diagram for explaining a preliminary pressing method used in evaluation of double images.

MODE(S) FOR CARRYING OUT THE INVENTION

Hereinafter, the details of the present invention will be described.

The interlayer film for laminated glass (in the present specification, sometimes abbreviated as "interlayer film") according to the present invention is used for laminated glass that is a head-up display (HUD). The interlayer film according to the present invention is an interlayer film for HUD.

The interlayer film according to the present invention has a region for display corresponding to a display region of a head-up display. The region for display is a region capable of favorably displaying information.

The interlayer film according to the present invention has a one-layer structure or a two or more-layer structure. The interlayer film according to the present invention may have a one-layer structure or may have a two or more-layer structure. The interlayer film according to the present invention may have a two-layer structure or may have a three or more-layer structure. The interlayer film according to the present invention may be a single-layered interlayer film or may be a multi-layered interlayer film.

The interlayer film according to the present invention has one end and the other end at the opposite side of the one end. The one end and the other end are end portions of both sides facing each other in the interlayer film. In the interlayer film according to the present invention, the thickness of the other end is larger than the thickness of the one end.

In the interlayer film according to the present invention, the variation in thickness is measured in a distance of 80 mm centered at points of every 2 mm intervals in a direction connecting the one end and the other end in the region for display from the one end to the other end. The variation in thickness is measured within the region for display. Taking the position of 4 cm from the end portion of the one end side toward the other end of the region for display as a start point, and the position of 4 cm from the end portion of the other end side toward the one end of the region for display as an end point, points are selected every 2 mm intervals, and a variation in thickness in a distance of 80 mm centered at each of the points in the direction connecting the one end and the other end is measured. For example, when the region for display from the one end side to the other end side is 500 mm long, points are selected every 2 mm intervals from the position of 4 mm from the one end side to the position of 496 mm of the region for display. When the region for display from the one end side to the other end side is 500 mm long, a variation in thickness in a distance of 80 mm centered at points of every 2 mm intervals in the direction connecting the one end and the other end is measured at 247 points every 2 mm intervals, and 247 measured values are obtained. A variation in thickness in a distance of 80 mm at point A is measured, a variation in thickness in a distance of 80 mm at next point B that is 2 mm next to point A is measured, and a variation in thickness in a distance of 80 mm at next point C that is next to point B is measured, and such measurement is repeated to obtain 247 measured values.

A variation in thickness is measured in each region (distance 80 mm) of every 2 mm intervals. The variation in thickness is an absolute value of difference between the maximum value and the minimum value of thickness in each region (distance 80 mm) of every 2 mm intervals.

In the interlayer film according to the present invention, an absolute value of difference between the maximum value of measured values of variation in thickness and the minimum value of measured values of variation in thickness is 32 μm or less. For example, when the region for display from the one end side to the other end side is 500 mm long, an absolute value of difference between the maximum value of 247 measured values of variation in thickness and the minimum value of 247 measured values of variation in thickness is 32 μm or less.

In the interlayer film according to the present invention, a region of the other end side from the region for display has a wedge angle that is smaller than a wedge angle of the region for display. The wedge angle of the region for display is an interior angle formed at the intersection point between a straight line connecting a point on the first surface (one surface) of the maximum thickness part of the region for display and a point on the first surface of the minimum thickness part of the region for display and a straight line connecting a point on the second surface (the other surface) of the maximum thickness part of the region for display and a point on the second surface of the minimum thickness part of the region for display. The wedge angle of a region of the other end side from the region for display is an interior angle formed at the intersection point between a straight line connecting a point on the first surface (one surface) of the maximum thickness part of the region of the other end side from the region for display and a point on the first surface of the minimum thickness part of the region of the other end side from the region for display and a straight line connecting a point on the second surface (the other surface) of the maximum thickness part of the region of the other end side from the region for display and a point on the second surface of the minimum thickness part of the region of the other end side from the region for display. In the later described FIGS. 1, 2, not a wedge angle of the region for display or a wedge angle of the region of the other end side from the region for display, but a wedge angle θ of the interlayer film is illustrated. The wedge angle of the region for display can be determined in the same manner as wedge angle θ in the region for display R1 of FIGS. 1, 2. The wedge angle of the region of the other end side from the region for display can be determined in the same manner as wedge angle θ in the region of the other end side from the region for display (upper peripheral region R2 and shading region R3) in FIGS. 1, 2.

In the present invention, since the aforementioned configuration is provided, it is possible to suppress both the reflected double images and the transmitted double images in the laminated glass. In the present invention, generation of both the reflected double images and the transmitted double images are suppressed when the display information from the display unit is reflected on the laminated glass.

From the viewpoint of further suppressing the transmitted double images, the wedge angle of the region of the other end side from the region for display is smaller than the wedge angle of the region for display by preferably 0.05 mrad or more, more preferably 0.1 mrad or more, further preferably 0.15 mrad or more, particularly preferably 0.2 mrad or more, most preferably 0.3 mrad or more. From the viewpoint of further suppressing the transmitted double images, the region of the other end side from the region for display has a wedge angle of preferably 0.7 mrad or less, more preferably 0.5 mrad or less, further preferably 0.3 mrad or less, particularly preferably 0.1 mrad or less. The wedge angle of the region of the other end side from the region for display may be 0 mrad or more, or may be 0.1 mrad or more.

From the viewpoint of suppressing the reflected double images more effectively, it is preferred that the thickness increase from the one end toward the other end in a region of 80% or more (more preferably 85% or more, further preferably 90% or more, particularly preferably 95% or more) of a region from a position of 10 cm toward the other end from the one end to a position of 59.8 cm toward the other end from the one end.

The interlayer film according to the present invention has a region for display corresponding to a display region of HUD. The region for display is a region capable of favorably displaying information. From the viewpoint of suppressing the reflected double images more effectively, it is preferred that the interlayer film according to the present invention have the region for display in a region from a position of 10 cm from the one end toward the other end to a position of 59.8 cm from the one end toward the other end.

From the viewpoint of suppressing the reflected double images effectively, it is preferred that the interlayer film have a portion having a sectional shape of wedge-like shape in the thickness direction in the region between a position of 10 cm toward the other end from the one end and a position of 59.8 cm toward the other end from the one end.

The interlayer film according to the present invention may have a shading region. The shading region may be separate from the region for display. The shading region is provided so as to prevent a driver from feeling glare while driving, for example, by sunlight or outdoor lighting. The shading region can be provided so as to impart the heat blocking property. It is preferred that the shading region be located in an edge portion of the interlayer film. It is preferred that the shading region be belt-shaped.

In the shading region, a coloring agent or a filler may be used so as to change the color and the visible light transmittance. The coloring agent or the filler may be contained in a partial region in the thickness direction of the interlayer film or may be contained in the entire region in the thickness direction of the interlayer film.

From the viewpoint of providing better display, and further broadening the field of view, the visible light transmittance of the region for display is preferably 80% or more, more preferably 88% or more, further preferably 90% or more. It is preferred that the visible light transmittance of the region for display be higher than the visible light transmittance of the shading region. The visible light transmittance of the region for display may be lower than the visible light transmittance of the shading region. The visible light transmittance of the region for display is higher than the visible light transmittance of the shading region preferably by 50% or more, more preferably by 60% or more.

When the visible light transmittance varies in the interlayer film of each of the region for display and the shading region, the visible light transmittance is measured at the center position of the region for display and at the center position of the shading region.

The visible light transmittance at a wavelength ranging from 380 to 780 nm of the obtained laminated glass can be measured by using a spectrophotometer ("U-4100" available from Hitachi High-Technologies Corporation) in conformity with JIS R3211 (1998). As the glass plate, it is preferred to use clear glass having a thickness of 2 mm.

It is preferred that the region for display have a length direction and a width direction. Since the interlayer film can be made to have excellent versatility, it is preferred that the width direction of the region for display be the direction connecting the one end and the other end. It is preferred that the region for display be belt-shaped.

It is preferred that the interlayer film have an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film. It is preferred that the one end and the other end be located on either side of the TD direction.

The MD direction and the TD direction can be confirmed, for example, by the winding up direction of the roll body of the interlayer film. This owes to the fact that in the roll body of the interlayer film, the interlayer film is wound up in the flow direction of the interlayer film at the time of its production, and thus the winding up direction of the interlayer film in the roll body and the flow direction of the interlayer film at the time of production of the interlayer film are identical with each other.

From the viewpoint of better display, it is preferred that the interlayer film have a portion with a sectional shape of wedge-like shape in the thickness direction. It is preferred that the sectional shape in the thickness direction of the region for display be a wedge-like shape.

Hereinafter, specific embodiments of the present invention will be described with reference to the drawings.

FIGS. 1(a) and (b) show a sectional view and a front view schematically showing an interlayer film for laminated glass in accordance with a first embodiment of the present invention. FIG. 1(a) is a sectional view along the line I-I in FIG. 1(b). The size and dimension of the interlayer film in FIG. 1 and later described drawings are appropriately changed from the actual size and shape for convenience of illustration.

In FIG. 1(a), a section in the thickness direction of an interlayer film 11 is shown. In this connection, in FIG. 1(a) and later described drawings, for convenience of illustration, the thicknesses of an interlayer film and respective layers constituting the interlayer film and the wedge angle θ are shown so as to be different from actual thicknesses thereof and an actual wedge angle.

The interlayer film 11 is provided with a first layer 1 (intermediate layer), a second layer 2 (surface layer), and a third layer 3 (surface layer). The second layer 2 is arranged on a first surface side of the first layer 1 to be layered thereon. The third layer 3 is arranged on a second surface side opposite to the first surface of the first layer 1 to be layered thereon. The first layer 1 is arranged between the second layer 2 and the third layer 3 to be sandwiched therebetween. The interlayer film 11 is used for obtaining laminated glass. The interlayer film 11 is an interlayer film for laminated glass. The interlayer film 11 is a multilayer interlayer film.

The interlayer film 11 has one end 11a and the other end 11b at the opposite side of the one end 11a. The one end 11a and the other end 11b are end parts of both sides facing each other. The sectional shape in the thickness direction of each of the second layer 2 and the third layer 3 is a wedge-like shape. The sectional shape in the thickness direction of the first layer 1 is a rectangular shape. The thickness of the other end 11b side of each of the second layer 2 and the third layer 3 is larger than that of the one end 11a side thereof. Accordingly, the thickness of the other end 11b of the interlayer film 11 is larger than the thickness of the one end 11a thereof. Accordingly, the interlayer film 11 has a region being thin in thickness and a region being thick in thickness.

The interlayer film 11 has a region for display R1 corresponding to a display region of a head-up display. The interlayer film 11 has a peripheral region R2 neighboring the region for display R1. In the present embodiment, the region for display R1 is a region between a position of 10 cm toward the other end 11b from the one end 11a and a position of 59.8 cm toward the other end 11b from the one end 11a.

The interlayer film 11 has a shading region R3 that is separate from the region for display R1. The shading region R3 is located in an edge portion of the interlayer film 11.

FIG. 4 is a perspective view schematically showing a roll body prepared by winding the interlayer film for laminated glass shown in FIG. 1.

The interlayer film 11 may be wound to be formed into a roll body 51 of the interlayer film 11.

The roll body 51 shown in FIG. 4 is provided with a winding core 61 and the interlayer film 11. The interlayer film 11 is wound around an outer periphery of the winding core 61.

FIGS. 2(a) and (b) show a sectional view and a front view schematically showing an interlayer film for laminated glass in accordance with a second embodiment of the present invention. FIG. 2(a) is a section view along the line I-I in FIG. 2(b). In FIG. 2(a), a section in the thickness direction of an interlayer film 11A is shown.

The interlayer film 11A shown in FIG. 2 is provided with a first layer 1A. The interlayer film 11A has a one-layer structure composed only of the first layer 1A and is a single-layered interlayer film. The interlayer film 11A is singly constituted by the first layer 1A. The interlayer film 11A is used for obtaining laminated glass. The interlayer film 11A is an interlayer film for laminated glass.

The interlayer film 11A has one end 11a and the other end 11b at the opposite side of the one end 11a. The one end 11a and the other end 11b are end parts of both sides facing each other. The thickness of the other end 11b of the interlayer film 11A is larger than the thickness of the one end 11a thereof. Accordingly, the interlayer film 11A and the first layer 1A have a region being thin in thickness and a region being thick in thickness.

The interlayer film 11A and the first layer 1A have portions 11Aa, 1Aa having a rectangular sectional shape in the thickness direction, and portions 11Ab, 1Ab having a wedge-like sectional shape in the thickness direction.

The interlayer film 11A has a region for display R1 corresponding to a display region of a head-up display. The interlayer film 11A has a peripheral region R2 neighboring the region for display R1.

The interlayer film 11A has a shading region R3 that is separate from the region for display R1. The shading region R3 is located in an edge portion of the interlayer film 11A.

It is preferred that the interlayer film have a portion with a sectional shape in the thickness direction being a wedge-like shape. It is preferred that the interlayer film have a portion where the thickness gradually increases from one end toward the other end. It is preferred that the sectional shape in the thickness direction of the interlayer film be a wedge-like shape. Examples of the sectional shape in the thickness direction of the interlayer film include a trapezoidal shape, a triangular shape, a pentagonal shape, and the like.

In order to suppress double images, the wedge angle θ of the interlayer film can be appropriately set according to the fitting angle of laminated glass. From the viewpoint of further suppressing double images, the wedge angle θ of the interlayer film is preferably 0.2 mrad (0.0115 degrees) or more and is preferably 2 mrad (0.1146 degrees) or less, more preferably 1 mrad (0.05273 degrees) or less, and further preferably 0.7 mrad (0.0401 degrees) or less. The wedge angle θ of the interlayer film is an interior angle formed at the intersection point between a straight line connecting a point on the first surface (one surface) of the maximum thickness part of the interlayer film and a point on the first surface of the minimum thickness part thereof and a straight line connecting a point on the second surface (the other surface) of the maximum thickness part of the interlayer film and a point on the second surface of the minimum thickness part thereof.

In order to suppress reflected double images, the wedge angle of the region for display of the interlayer film can be appropriately set according to the fitting angle of laminated glass. From the viewpoint of further suppressing double images, the wedge angle of the region for display of the interlayer film is preferably 0.2 mrad (0.0115 degrees) or more and is preferably 2 mrad (0.1146 degrees) or less, and more preferably 1 mrad (0.05273 degrees) or less.

The thickness of the interlayer film is not particularly limited. The thickness of the interlayer film refers to the total thickness of the respective layers constituting the interlayer film. Thus, in the case of a multi-layered interlayer film 11, the thickness of the interlayer film refers to the total thickness of the first layer 1, the second layer 2, and the third layer 3.

The maximum thickness of the interlayer film is preferably 0.1 mm or more, more preferably 0.25 mm or more, further preferably 0.5 mm or more, and particularly preferably 0.8 mm or more and is preferably 3 mm or less, more preferably 2 mm or less, and further preferably 1.5 mm or less.

When the distance between one end and the other end is defined as X, it is preferred that the interlayer film have a minimum thickness in a region within a distance of 0X to 0.2X from the one end toward the inside and have a maximum thickness in a region within a distance of 0X to 0.2X from the other end toward the inside, and it is more preferred that the interlayer film have a minimum thickness in a region within a distance of 0X to 0.1X from the one end toward the inside and have a maximum thickness in a region within a distance of 0X to 0.1X from the other end toward the inside. It is preferred that the interlayer film have a minimum thickness at the one end and the interlayer film have a maximum thickness at the other end. The interlayer film 11, 11A has a maximum thickness at the other end 11b and a minimum thickness at the one end 11a.

From the viewpoint of the practical aspect and the viewpoint of sufficiently heightening the adhesive force and the penetration resistance, the maximum thickness of a surface layer is preferably 0.001 mm or more, more preferably 0.2 mm or more, and further preferably 0.3 mm or more and is preferably 1 mm or less, and more preferably 0.8 mm or less.

From the viewpoint of the practical aspect and the viewpoint of sufficiently enhancing the penetration resistance, the maximum thickness of a layer (intermediate layer) arranged between two surface layers is preferably 0.001 mm or more, more preferably 0.1 mm or more, and further preferably 0.2 mm or more and is preferably 0.8 mm or less, more preferably 0.6 mm or less, and further preferably 0.3 mm or less.

The distance X between one end and the other end of the interlayer film is preferably 3 m or less, more preferably 2 m or less, and particularly preferably 1.5 m or less and is preferably 0.5 m or more, more preferably 0.8 m or more, and particularly preferably 1 m or more.

Hereinafter, the details of materials constituting the respective layers of a multi-layered interlayer film and the single-layered interlayer film will be described.
(Thermoplastic Resin)

It is preferred that the interlayer film (the respective layers) contain a thermoplastic resin (hereinafter, sometimes described as a thermoplastic resin (0)) and it is preferred that the interlayer film (the respective layers) contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)) and it is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)) and it is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)) and it is preferred that the third layer contain a polyvinyl acetal resin (hereinafter, sometimes described as a polyvinyl acetal resin (3)) as the thermoplastic resin (3). Although the thermoplastic resin (1), the thermoplastic resin (2), and the thermoplastic resin (3) may be the same as or different from one another, it is preferred that the thermoplastic resin (1) be different from the thermoplastic resin (2) and the thermoplastic resin (3) because the sound insulating properties are further heightened. Although the polyvinyl acetal resin (1), the polyvinyl acetal resin (2), and the polyvinyl acetal resin (3) may be the same as or different from one another, it is preferred that the polyvinyl acetal resin (1) be different from the polyvinyl acetal resin (2) and the polyvinyl acetal resin (3) because the sound insulating properties are further heightened. One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of a layer containing the polyvinyl acetal resin and the plasticizer to a lamination glass member or another layer is further heightened.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, even more preferably 1500 or more, further preferably 1600 or more, particularly preferably 2600 or more, and most preferably 2700 or more and is preferably 5000 or less, more preferably 4000 or less, and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin (0) is preferably 15% by mole or more, and more preferably 18% by mole or more and is preferably 40% by mole or less, and more preferably 35% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

The content of the hydroxyl group (the amount of hydroxyl groups) of the polyvinyl acetal resin (1) is preferably 17% by mole or more, more preferably 20% by mole or more, and further preferably 22% by mole or more and is preferably 28% by mole or less, more preferably 27% by mole or less, further preferably 25% by mole or less, and particularly preferably 24% by mole or less. When the content of the hydroxyl group is the above lower limit or more, the mechanical strength of the interlayer film is further heightened. In particular, when the content of the hydroxyl group of the polyvinyl acetal resin (1) is 20% by mole or more, the resin is high in reaction efficiency and is excellent in productivity, and moreover, when being 28% by mole or less, the sound insulating properties of laminated glass are further heightened. Moreover, when the content of the hydroxyl group is the above upper limit or less, the flexibility of the interlayer film is enhanced and the handling of the interlayer film is facilitated.

The content of the hydroxyl group of each of the polyvinyl acetal resin (2) and the polyvinyl acetal resin (3) is preferably 25% by mole or more, more preferably 28% by mole or more, more preferably 30% by mole or more, even more preferably 31.5% by mole or more, further preferably 32% by mole or more, and particularly preferably 33% by mole or more and is preferably 38% by mole or less, more preferably 37% by mole or less, further preferably 36.5% by mole or less, and particularly preferably 36% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of further heightening the sound insulating properties, it is preferred that the content of the hydroxyl group of the polyvinyl acetal resin (1) be lower than the content of the hydroxyl group of the polyvinyl acetal resin (3). From the viewpoint of still further heightening the sound insulating properties, the absolute value of difference between the content of the hydroxyl group of the polyvinyl acetal resin (1) and the content of the hydroxyl group of the polyvinyl acetal resin (2) and the absolute value of difference between the content of the hydroxyl group of the polyvinyl acetal resin (1) and the content of the hydroxyl group of the polyvinyl acetal resin (3) are preferably 1% by mole or more, more preferably 5% by mole or more, further preferably 9% by mole or more, particularly preferably 10% by mole or more, and most preferably 12% by mole or more. The absolute value of difference between the content of the hydroxyl group of the polyvinyl acetal resin (1) and the content of the hydroxyl group of the polyvinyl acetal resin (2) and the absolute value of difference between the content of the hydroxyl group of the polyvinyl acetal resin (1) and the content of the hydroxyl group of the polyvinyl acetal resin (3) are preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, and further preferably 9% by mole or more and is preferably 30% by mole or less, more preferably 25% by mole or less, further preferably 24% by mole or less, and particularly preferably 20% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more, and more preferably 0.5% by mole or more and is preferably 10% by mole or less, and more preferably 2% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more, and more preferably 63% by mole or more and is preferably 85% by mole or less, more preferably 75% by mole or less, and further preferably 70% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more, and more preferably 60% by mole or more and is preferably 85% by mole or less, more preferably 80% by mole or less, and further preferably 75% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, and more preferably 60% by mole or more and is preferably 75% by mole or less, and more preferably 71% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Plasticizer)

From the viewpoint of further heightening the adhesive force of an interlayer film, it is preferred that the interlayer film according to the present invention contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in the interlayer film is a polyvinyl acetal resin, it is particularly preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

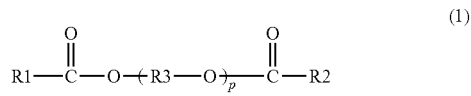

(1)

In the foregoing formula (1), R1 and R2 each represent an organic group with 5 to 10 carbon atoms, R3 represents an ethylene group, an isopropylene group, or a n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

The content of the plasticizer (0) relative to 100 parts by weight of the thermoplastic resin (0) in the interlayer film is preferably 25 parts by weight or more, and more preferably 30 parts by weight or more and is preferably 100 parts by weight or less, more preferably 60 parts by weight or less, and further preferably 50 parts by weight or less. When the content of the plasticizer (0) is the above lower limit or more, the penetration resistance of laminated glass is further enhanced. When the content of the plasticizer (0) is the above upper limit or less, the transparency of the interlayer film is further enhanced.

The content of the plasticizer (1) (hereinafter, sometimes described as the content (1)) relative to 100 parts by weight of the thermoplastic resin (1) is preferably 50 parts by weight or more, more preferably 55 parts by weight or more, and further preferably 60 parts by weight or more and is preferably 100 parts by weight or less, more preferably 90 parts by weight or less, further preferably 85 parts by weight or less, and particularly preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

Each of the content of the plasticizer (2) (hereinafter, sometimes described as the content (2)) relative to 100 parts by weight of the thermoplastic resin (2) and the content of the plasticizer (3) (hereinafter, sometimes described as the content (3)) relative to 100 parts by weight of the thermoplastic resin (3) is preferably 10 parts by weight or more, more preferably 15 parts by weight or more, further preferably 20 parts by weight or more, and particularly preferably 24 parts by weight or more and is preferably 40 parts by weight or less, more preferably 35 parts by weight or less, further preferably 32 parts by weight or less, and particularly preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

For the purpose of heightening the sound insulating properties of laminated glass, it is preferred that the content (1) be larger than the content (2) and it is preferred that the content (1) be larger than the content (3).

From the viewpoint of further heightening the sound insulating properties of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, and further preferably 70 parts by weight or less.

(Heat Shielding Compound)

It is preferred that the interlayer film contain a heat shielding compound. It is preferred that the first layer contain a heat shielding compound. It is preferred that the second layer contain a heat shielding compound. It is preferred that the third layer contain a heat shielding compound. One kind of the heat shielding compound may be used alone, and two or more kinds thereof may be used in combination.

It is preferred that the heat shielding compound be constituted of at least one kind of Ingredient X among a phthalocyanine compound, a naphthalocyanine compound, and an anthracyanine compound or be constituted of heat shielding particles. In this case, the heat shielding compound may be constituted of both of the Ingredient X and the heat shielding particles Ingredient X:

It is preferred that the interlayer film contain a phthalocyanine compound, a naphthalocyanine compound, or an anthracyanine compound (hereinafter, a phthalocyanine compound, a naphthalocyanine compound, and an anthracyanine compound are also called Ingredient X). It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be phthalocyanine, a derivative of phthalocyanine, naphthalocyanine or a derivative of naphthalocyanine, and it is more preferred that the Ingredient X be phthalocyanine or a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be phthalocyanine containing vanadium atoms or copper atoms or a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, and particularly preferably 0.02% by weight or more and is preferably 0.2% by weight or less, more preferably 0.1% by weight or less, further preferably 0.05% by weight or less, and particularly preferably 0.04% by weight or less. When the content of the Ingredient X is the above lower limit or more and the above upper limit or less, the heat shielding properties are sufficiently enhanced and the visible light transmittance is sufficiently heightened. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and particularly preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are particularly preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 µm or more, and more preferably 0.02 µm or more and is preferably 0.1 µm or less, and more preferably 0.05 µm or less. When the average particle diameter is the above lower limit or more, the heat ray shielding properties are sufficiently heightened. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, or a third layer), each content of the heat shielding particles (in particular, the content of tungsten oxide particles) is preferably 0.01% by weight or more, more preferably 0.1% by weight or more, further preferably 1% by weight or more, and particularly preferably 1.5% by weight or more and is preferably 6% by weight or less, more preferably 5.5% by weight or less, further preferably 4% by weight or less, particularly preferably 3.5% by weight or less, and most preferably 3% by weight or less. When the content of the heat shielding particles is the above lower limit or more and the above upper limit or less, the heat shielding properties are sufficiently enhanced and the visible light transmittance is sufficiently heightened.

(Metal Salt)

It is preferred that the interlayer film contain an alkali metal salt, an alkaline earth metal salt, or a magnesium salt (hereinafter, these are sometimes described as Metal salt M). It is preferred that the interlayer film contain alkali metal derived from the Metal salt M. It is preferred that the interlayer film contain alkaline earth metal derived from the Metal salt M. It is preferred that the interlayer film contain magnesium derived from the Metal salt M. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain Li, Na, K, Rb, Cs, Mg, Ca, Sr or Ba. It is preferred that the metal salt included in the interlayer film contain K or Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, or a third layer) is preferably 5 ppm or more, more preferably 10 ppm or more, and further preferably 20 ppm or more and is preferably 300 ppm or less, more preferably 250 ppm or less, and further preferably 200 ppm or less. When the total of the contents of Mg and K is the above lower limit or more and the above upper limit or less, the adhesivity between the interlayer film and a lamination glass member such as a glass plate or the adhesivity between respective layers in the interlayer film can be further well controlled.

(Ultraviolet Ray Screening Agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include oxalic acid diamides having a substituted aryl group and the like on the nitrogen atom, such as N-(2-ethylphenyl)-N'-(2-ethoxy-5-t-butylphenyl) oxalic acid diamide, N-(2-ethylphenyl)-N'-(2-ethoxy-phenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of the interlayer film or in 100% by weight of a layer containing the ultraviolet ray screening agent (a first layer, a second layer, or a third layer), the content of the ultraviolet ray screening agent, for example, the content of the benzotriazole compound, is preferably 0.1% by weight or more, more preferably 0.2% by weight or more, further preferably 0.3% by weight or more, and particularly preferably 0.5% by weight or more and is preferably 2.5% by weight or less, more preferably 2% by weight or less, further preferably 1% by weight or less, and particularly preferably 0.8% by weight or less. In particular, by setting the content of the ultraviolet ray screening agent to 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of the oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer, and the third layer may contain additives such as a coupling agent, a dispersing agent, a surfactant, a flame retardant, an antistatic agent, a pigment, a dye, a moisture-resistance agent, a fluorescent brightening agent, and an infrared ray absorber, as necessary. One kind of these additives may be used alone, and two or more kinds thereof may be used in combination.

(Laminated Glass)

FIG. 3 is a sectional view showing an example of laminated glass prepared with the interlayer film for laminated glass shown in FIG. 1.

A laminated glass 21 shown in FIG. 3 is provided with the interlayer film 11, a first lamination glass member 22, and a second lamination glass member 23. The interlayer film 11 is arranged between the first lamination glass member 22 and the second lamination glass member 23 to be sandwiched therebetween. The first lamination glass member 22 is arranged on a first surface of the interlayer film 11. The second lamination glass member 23 is arranged on a second surface opposite to the first surface of the interlayer film 11.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET (polyethylene terephthalate) film and the interlayer film include at least one glass plate as the first lamination glass member or the second lamination glass member. It is particularly preferred that both of the first lamination glass member and the second lamination glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

Although respective thicknesses of the first lamination glass member and the second lamination glass member are not particularly limited, the thickness is preferably 1 mm or more and preferably 5 mm or less. When the lamination glass member is a glass plate, the thickness of the glass plate is preferably 1 mm or more and preferably 5 mm or less. When the lamination glass member is a PET film, the thickness of the PET film is preferably 0.03 mm or more and preferably 0.5 mm or less.

The method for producing the laminated glass is not particularly limited. For example, the interlayer film is sandwiched between the first and second lamination glass members, and then, passed through pressure rolls or subjected to decompression suction in a rubber bag. Therefore, the air remaining between the first lamination glass member and the interlayer film and between the second lamination glass member and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings, and the like. It is preferred that the laminated glass be laminated glass for building or for vehicles and it is more preferred that the laminated glass be laminated glass for vehicles. The laminated glass can also be used for applications other than these applications. The laminated glass can be used for a windshield, side glass, rear glass, or roof glass of an automobile, and the like. Since the laminated glass is high in heat shielding properties and is high in visible light transmittance, the laminated glass is suitably used for automobiles.

The laminated glass is a kind of laminated glass serving as a head-up display (HUD). In the laminated glass, measured information such as the speed which is sent from a control unit and the like can be projected onto the windshield from a display unit of the instrumental panel. Accordingly, without making a driver of an automobile move his or her visual field downward, a front visual field and measured information can be visually recognized simultaneously.

Hereinafter, the present invention will be described in more detail with reference to examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

Example 1

Preparation of Composition for Forming Interlayer Film:
To 100 parts by weight of a polyvinyl acetal resin (average polymerization degree: 1700, content of the hydroxyl group: 30.5% by mole, acetylation degree: 1% by mole, acetalization degree: 68.5% by mole), 40 parts by weight of triethylene glycol di-2-ethylhexanoate (3GO), 0.2 parts by weight of Tinuvin 326 (2-(2'-hydroxy-3'-t-butyl-5-methylphenyl)-5-chlorobenzotriazole, "Tinuvin 326" available from BASF Japan Ltd.), and 0.2 parts by weight of BHT (2,6-di-t-butyl-p-cresol) were added, and sufficiently kneaded with a mixing roll, to obtain a composition for forming an interlayer film.
Preparation of Interlayer Film:
The composition for forming an interlayer film was extruded by using an extruder. In Example 1, an interlayer film was extrusion molded to prepare a wedge-like single-layered interlayer film. The obtained interlayer film has a minimum thickness at one end and has a maximum thickness at the other end. Also, the obtained interlayer film has the region for display in the region between a position of 10 cm toward the other end from one end and a position of 59.8 cm toward the other end from the one end.

Example 2, and Comparative Examples 1 to 2

Interlayer films for laminated glass were obtained in the same manner as in Example 1 except that an interlayer film was extrusion molded by using a mold different from that in Example 1, and the wedge angle of the region for display, the wedge angle of the region of the other end side from the region for display, and the variation in thickness in the region for display were set as shown in Table 1 below.

Example 3

Preparation of Composition for Forming First Layer:
To 100 parts by weight of a polyvinyl acetal resin (average polymerization degree: 3000, content of the hydroxyl group: 22% by mole, acetylation degree: 13% by mole, acetalization degree: 65% by mole), 60 parts by weight of triethylene glycol di-2-ethylhexanoate (3GO), 0.2 parts by weight of Tinuvin 326 (2-(2'-hydroxy-3'-t-butyl-5-methylphenyl)-5-chlorobenzotriazole, "Tinuvin 326" available from BASF Japan Ltd.), and 0.2 parts by weight of BHT (2,6-di-t-butyl-p-cresol) were added, and sufficiently kneaded with a mixing roll, to obtain a composition for forming the first layer.
Preparation of Composition for Forming Second Layer and Third Layer:
To 100 parts by weight of a polyvinyl acetal resin (average polymerization degree: 1700, content of the hydroxyl group: 30.5% by mole, acetylation degree: 1% by mole, acetalization degree: 68.5% by mole), 38 parts by weight of triethylene glycol di-2-ethylhexanoate (3GO), 0.2 parts by weight of Tinuvin 326 (2-(2'-hydroxy-3'-t-butyl-5-methylphenyl)-5-chlorobenzotriazole, "Tinuvin 326" available from BASF Japan Ltd.), and 0.2 parts by weight of BHT (2,6-di-t-butyl-p-cresol) were added, and sufficiently kneaded with a mixing roll, to obtain a composition for forming the second layer and the third layer.
Preparation of Interlayer Film:
The composition for forming the first layer, and the composition for forming the second layer and the third layer were coextruded by using a co-extruder. A wedge-like interlayer film having a multilayer structure of the second layer/the first layer/the third layer was prepared. The obtained interlayer film has a minimum thickness at one end and has a maximum thickness at the other end. Also, the obtained interlayer film has the region for display in the region between a position of 10 cm toward the other end from one end and a position of 59.8 cm toward the other end from the one end.

Examples 4 to 8, and Comparative Examples 3 to 6

Interlayer films for laminated glass were obtained in the same manner as in Example 3 except that an interlayer film was extrusion molded by using a mold different from that in Example 1, and the wedge angle of the region for display, the wedge angle of the region of the other end side from the region for display, and the variation in thickness in the region for display were set as shown in Tables 2, 3 below.
(Evaluation)
(0) Thickness
In the obtained interlayer film, between the position of 14 cm from one end of the interlayer film and the position of 55.8 cm, points were selected every 2 mm intervals, and a variation in thickness in a distance of 80 mm centered at each of the points in the direction connecting the one end and the other end was measured. Among the values of variation in thickness, the maximum value (maximum value of variation in thickness) and the minimum value (minimum value of variation in thickness) were evaluated. An absolute value of difference between the maximum value of variation in thickness and the minimum value of variation in thickness was determined.

(1) Double Images

A pair of glass plates (clear glass, the size of 510 mm×910 mm, 2.0 mm in thickness) was prepared. An interlayer film with a size corresponding to the size of the glass plate was sandwiched between the pair of glass plates to obtain a laminate. As shown in FIG. 5, the obtained laminate was fitted into a frame of an EPDM-made rubber tube (frame member). The rubber tube had a width of 15 mm. Next, the laminate fitted into a frame of an EPDM-made rubber tube was preliminarily press-bonded by a vacuum bag method. The preliminarily press-bonded laminate was subjected to press-bonding at 150° C. and a pressure of 1.2 MPa with the use of an autoclave to obtain a sheet of laminated glass.

The obtained sheet of laminated glass was installed at a position of the windshield. The information to be displayed, which is emitted from a display unit installed below the sheet of laminated glass, was reflected by the sheet of laminated glass to visually confirm the presence or absence of reflected double images at a prescribed position. Further, presence or absence of transmitted double images were visually checked by irradiation of light from the light source located 7 m away from the laminated glass on the other end side from the display region of the laminated glass. The reflected double images in the display region of the laminated glass (the region for display of the interlayer film) and the transmitted double images in the region of the other end side from the display region of the laminated glass (the region of the other end side from the region for display of the interlayer film) were judged according to the following criteria.

[Criteria for Judgment in Reflected Double Images]
○: Reflected double images are not confirmed.
x: Reflected double images are confirmed

[Criteria for Judgment in Transmitted Double Images]
○: Transmitted double images are not confirmed.
x: Transmitted double images are confirmed The details and the results are shown in the following Tables 1 to 3.

TABLE 1

| | | \multicolumn{4}{c}{Single-layered interlayer film} |
|---|---|---|---|---|---|
| | | Example 1 | Example 2 | Comparative Example 1 | Comparative Example 2 |
| Wedge angle of region for display of interlayer film | mrad | 0.8 | 0.8 | 0.8 | 0.4 |
| Wedge angle of region of the other end side from display region of laminated glass | mrad | 0.4 | 0.2 | 0.8 | 0.8 |
| Maximum value of variation in thickness in region for display of interlayer film | μm | 80 | 80 | 80 | 48 |
| Minimum value of variation in thickness in region for display of interlayer film | μm | 48 | 48 | 48 | 16 |
| Absolute value of difference between maximum value and minimum value of variation in thickness in region for display of interlayer film | μm | 32 | 32 | 32 | 32 |
| Reflected double images of display region of laminated glass | | ○ | ○ | ○ | ○ |
| Transmitted double images of the other end side from display region of laminated glass | | ○ | ○ | x | x |

TABLE 2

| | | \multicolumn{6}{c}{Three-layered interlayer film} |
|---|---|---|---|---|---|---|---|
| | | Example 3 | Example 4 | Example 5 | Example 6 | Example 7 | Example 8 |
| Wedge angle of region for display of interlayer film | mrad | 0.8 | 0.8 | 0.8 | 0.8 | 0.8 | 0.8 |
| Wedge angle of region of the other end side from display region of laminated glass | mrad | 0.4 | 0.2 | 0.1 | 0.2 | 0.2 | 0.01 |
| Maximum value of variation in thickness in region for display of interlayer film | μm | 80 | 80 | 80 | 80 | 64 | 64 |
| Minimum value of variation in thickness in region for display of interlayer film | μm | 48 | 48 | 48 | 64 | 48 | 48 |
| Absolute value of difference between maximum value and minimum value of variation in thickness in region for display of interlayer film | μm | 32 | 32 | 32 | 16 | 16 | 16 |
| Reflected double images of display region of laminated glass | | ○ | ○ | ○ | ○ | ○ | ○ |
| Transmitted double images of the other end side from display region of laminated glass | | ○ | ○ | ○ | ○ | ○ | ○ |

TABLE 3

Three-layered interlayer film

| | | Comparative Example 3 | Comparative Example 4 | Comparative Example 5 | Comparative Example 6 |
|---|---|---|---|---|---|
| Wedge angle of region for display of interlayer film | mrad | 0.8 | 0.4 | 0.8 | 0.8 |
| Wedge angle of region of the other end side from display region of laminated glass | mrad | 0.8 | 0.8 | 0.2 | 0.8 |
| Maximum value of variation in thickness in region for display of interlayer film | μm | 80 | 48 | 80 | 80 |
| Minimum value of variation in thickness in region for display of interlayer film | μm | 48 | 16 | 32 | 32 |
| Absolute value of difference between maximum value and minimum value of variation in thickness in region for display of interlayer film | μm | 32 | 32 | 48 | 48 |
| Reflected double images of display region of laminated glass | | ○ | ○ | x | x |
| Transmitted double images of the other end side from display region of laminated glass | | x | x | ○ | x |

In this connection, sheets of laminated glass prepared with interlayer films obtained in Examples 3 to 8 respectively were evaluated for the sound insulating properties with sound transmission losses, and as a result, it was confirmed that the sheets are excellent in sound insulating properties.

EXPLANATION OF SYMBOLS 1, 1A: First layer
1Aa: Portion having sectional shape in thickness direction of rectangular shape
1Ab: Portion having sectional shape in thickness direction of wedge-like shape
2: Second layer
3: Third layer
11, 11A: Interlayer film
11a: One end
11b: The other end
11Aa: Portion having sectional shape in thickness direction of rectangular shape
11Ab: Portion having sectional shape in thickness direction of wedge-like shape
21: Laminated glass
22: First lamination glass member
23: Second lamination glass member
51: Roll body
61: Winding core
R1: Region for display
R2: Peripheral region
R3: Shading region

The invention claimed is:

1. An interlayer film for laminated glass used for laminated glass that is a head-up display,
the interlayer film comprising a region for display corresponding to a display region of the head-up display, the interlayer film having one end and an other end on an opposite side of the one end, the other end having a thickness larger than a thickness of the one end, and
an absolute value of a difference between a maximum value of measured values of variation in thickness and a minimum value of measured values of variation in thickness being 32 μm or less when the variation in thickness is measured in a distance of 80 mm centered at points of every 2 mm intervals in a direction connecting the one end and the other end in the region for display from the one end to the other end,
wherein the interlayer film satisfies at least one selected from constitutions (1), (2) and (3), as described below:
constitution (1): a region of the other end side from the region for display having a wedge angle of 0 mrad or more and 0.3 mrad or less, and the region of the other end side from the region for display having a wedge angle that is smaller than a wedge angle of the region for display by 0.05 mrad or more,
constitution (2): a region of the other end side from the region for display having a wedge angle of 0 mrad or more, the region of the other end side from the region for display having a wedge angle that is smaller than a wedge angle of the region for display by 0.05 mrad or more, and the wedge angle of the region for display being 0.61 mrad or more,
constitution (3): a region of the other end side from the region for display having a wedge angle of 0 mrad or more, and the region of the other end side from the region for display having a wedge angle that is smaller than the wedge angle of the region for display by 0.3 mrad or more.

2. The interlayer film for laminated glass according to claim 1, wherein the interlayer film has the region for display in a region between a position of 10 cm toward the other end from the one end and a position of 59.8 cm toward the other end from the one end.

3. The interlayer film for laminated glass according to claim 1, wherein the interlayer film satisfies at least one selected from constitutions (1), (2A) and (3A), as described below:
constitution (1): a region of the other end side from the region for display having a wedge angle of 0 mrad or more and 0.3 mrad or less, and the region of the other end side from the region for display having a wedge angle that is smaller than a wedge angle of the region for display by 0.05 mrad or more,
constitution (2A): a region of the other end side from the region for display having a wedge angle of 0 mrad or more and 0.7 mrad or less, the region of the other end side from the region for display having a wedge angle that is smaller than a wedge angle of the region for display by 0.05 mrad or more and the wedge angle of the region for display being 0.61 mrad or more,
constitution (3A): a region of the other end side from the region for display having a wedge angle of 0 mrad or more and 0.7 mrad or less, and the region of the other end side from the region for display having a wedge angle that is smaller than the wedge angle of the region for display by 0.3 mrad or more.

4. The interlayer film for laminated glass according to claim 3, wherein the interlayer film satisfies at least one selected from constitutions (1), (2B) and (3B), as described below:
constitution (1): a region of the other end side from the region for display having a wedge angle of 0 mrad or more and 0.3 mrad or less, and the region of the other end side from the region for display having a wedge angle that is smaller than a wedge angle of the region for display by 0.05 mrad or more, constitution (2B): a region of the other end side from the region for display having a wedge angle of 0 mrad or more and 0.5 mrad or less, the region of the other end side from the region for display having a wedge angle that is smaller than a wedge angle of the region for display by 0.05 mrad or more, and the wedge angle of the region for display being 0.61 mrad or more, constitution (3B): a region of the other end side from the region for display having a wedge angle of 0 mrad or more and 0.5 mrad or less, and the region of the other end side from the region for display having a wedge angle that is smaller than the wedge angle of the region for display by 0.3 mrad or more.

5. The interlayer film for laminated glass according to claim 4, wherein the interlayer film satisfies at least one selected from constitutions (1C) and (2C), as described below:

constitution (1C): a region of the other end side from the region for display having a wedge angle of 0 mrad or more and 0.3 mrad or less, and the region of the other end side from the region for display having a wedge angle that is smaller than a wedge angle of the region for display by 0.05 mrad or more, and constitution (2C): a region of the other end side from the region for display having a wedge angle of 0 mrad or more and 0.3 mrad or less, the region of the other end side from the region for display having a wedge angle that is smaller than a wedge angle of the region for display by 0.05 mrad or more, and the wedge angle of the region for display being 0.61 mrad or more.

6. The interlayer film for laminated glass according to claim 5, wherein the interlayer film satisfies at least one selected from constitutions (1D) and (2D), as described below:

constitution (1D): a region of the other end side from the region for display having a wedge angle of 0 mrad or more and 0.1 mrad or less, and the region of the other end side from the region for display having a wedge angle that is smaller than a wedge angle of the region for display by 0.05 mrad or more, and constitution (2D): a region of the other end side from the region for display having a wedge angle of 0 mrad or more and 0.1 mrad or less, the region of the other end side from the region for display having a wedge angle that is smaller than a wedge angle of the region for display by 0.05 mrad or more, and the wedge angle of the region for display being 0.61 mrad or more.

7. The interlayer film for laminated glass according to claim 1, further comprising a thermoplastic resin.

8. The interlayer film for laminated glass according to claim 1, further comprising a plasticizer.

9. The interlayer film for laminated glass according to claim 1, further comprising:
a first layer; and
a second layer arranged on a first surface side of the first layer.

10. The interlayer film for laminated glass according to claim 9, wherein
the first layer contains a polyvinyl acetal resin,
the second layer contains a polyvinyl acetal resin, and
a content of a hydroxyl group of the polyvinyl acetal resin in the first layer is lower than a content of a hydroxyl group of the polyvinyl acetal resin in the second layer.

11. The interlayer film for laminated glass according to claim 9, wherein
the first layer contains a polyvinyl acetal resin,
the second layer contains a polyvinyl acetal resin,
the first layer contains a plasticizer,
the second layer contains a plasticizer, and
a content of the plasticizer in the first layer relative to 100 parts by weight of the polyvinyl acetal resin in the first layer is larger than a content of the plasticizer in the second layer relative to 100 parts by weight of the polyvinyl acetal resin in the second layer.

12. A laminated glass comprising:
a first lamination glass member;
a second lamination glass member; and
the interlayer film for laminated glass according to claim 1,
the interlayer film for laminated glass being arranged between the first lamination glass member and the second lamination glass member.

13. The interlayer film for laminated glass according to claim 1, satisfying at least one selected from the constitutions (1) and (3).

14. The interlayer film for laminated glass according to claim 1, further comprising an ultraviolet ray screening agent containing a metal oxide.

15. The interlayer film for laminated glass according to claim 14, wherein a surface of the ultraviolet ray screening agent is coated with an insulating metal oxide, a hydrolyzable organosilicon compound, or a silicone compound.

16. The interlayer film for laminated glass according to claim 1, wherein the absolute value of a difference between the maximum value of measured values of variation in thickness and the minimum value of measured values of variation in thickness is 16 µm or more.

* * * * *